H. E. TOWNSEND.
COLLAPSIBLE CORE.
APPLICATION FILED MAR. 17, 1920.

1,402,979.

Patented Jan. 10, 1922.

Inventor.
Hal E. Townsend
by G. L. Ely
Atty.

UNITED STATES PATENT OFFICE.

HAL E. TOWNSEND, OF AKRON, OHIO, ASSIGNOR TO THE FIRESTONE TIRE AND RUBBER COMPANY, OF AKRON, OHIO, A CORPORATION OF OHIO.

COLLAPSIBLE CORE.

1,402,979.  Specification of Letters Patent.  Patented Jan. 10, 1922.

Application filed March 17, 1920. Serial No. 366,715.

*To all whom it may concern:*

Be it known that I, HAL E. TOWNSEND, a citizen of the United States, residing at Akron, in the county of Summit and State of Ohio, have invented certain new and useful Improvements in Collapsible Cores, of which the following is a specification.

This invention relates to collapsible cores used in the manufacture of pneumatic tires upon which the outer casings or carcasses are built, and has for its principal object the provision of a locking means for securely locking the several arcuate sections together, that will allow the cores to be assembled or disassembled with great facility, dispensing with the loose bolts and nuts frequently used in holding the locking rings in place.

A further object is to devise a means for locking the customary clamping means in place which shall be easy and quick in operation and will securely clamp the several core sections in proper alignment when assembled.

Figure 1:
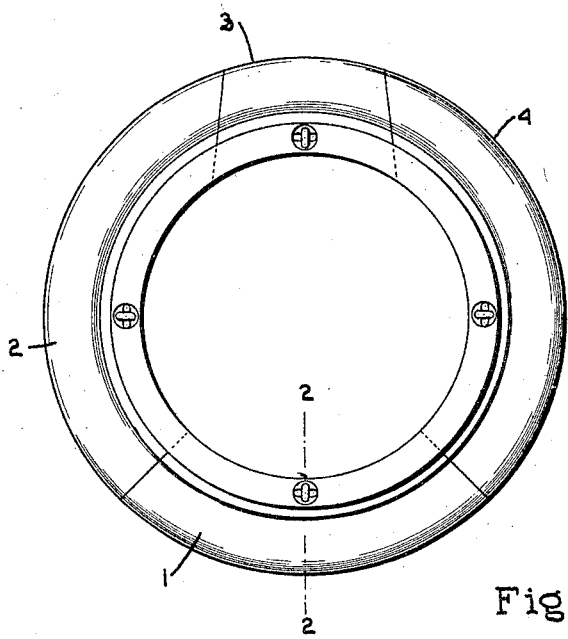
Fig. 1 is a side elevation of a collapsible core embodying my invention.

Customarily the core embodying this invention is composed of several arcuate sections that when assembled form an annulus. The sections are so constructed that at least one of them may be moved inwardly, thus permitting the other sections to be collapsed when the locking means, hereinafter described, is released, when it is desired to remove the core from the tire carcass formed thereon. These sections are designated in the drawings by numerals 1, 2, 3, and 4, of which 3 is shown as the key section which may be removed when the carcass is finished. The tongue portion of each of the sections is provided with segmental ribs which, when the core is assembled, form annular ribs on each side of the core. These ribs 5 and 6 are for the purpose of receiving locking rings 7 and 7a and are shown in cross section as being made with tapering sides 8 and 9. The rings have corresponding tapered channels that fit over the ribs, and hold the several sections in alignment when they are forced together by the locking pins.

Figure 5:
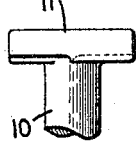
Fig. 5 is a detail view of the preferred form of locking pin.
Figure 2:
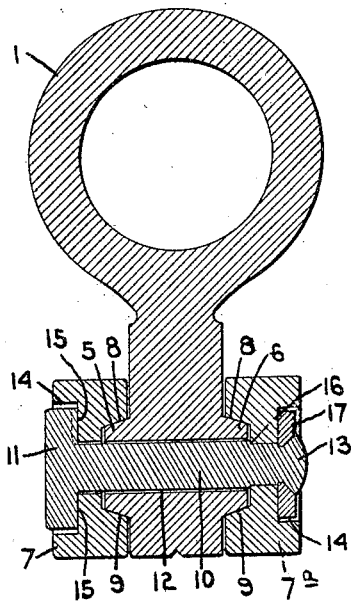
Fig. 2 is an enlarged cross sectional view taken on line 2—2, Fig. 1.
Figure 3:
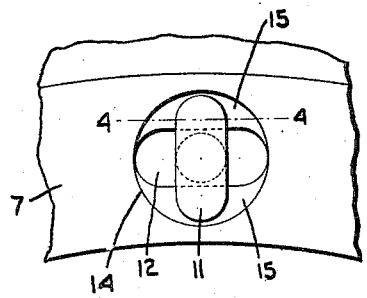
Fig. 3 is an enlarged view in elevation of the locking member and clamping rings embodied in my invention.
Figure 4:
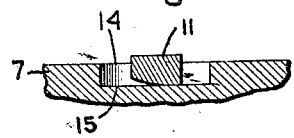
Fig. 4 is a view taken on line 4—4, Fig. 3.

The locking means illustrated in the drawings consists of pins or studs 10 which may be conveniently spaced equidistantly about the core, having T-shaped heads 11, the underside of which are beveled, the opposite extremities being beveled in the inverse direction, as shown in Fig. 5. The core sections and the ring 7 are provided with elongated holes or slots 12, through which the T-shaped heads 11 may freely pass. The opposite ends of the pins 10 are revolubly secured in the ring 7a. The portion of the pin that passes through the ring 7a is reduced in diameter and the shoulder 16 thus formed keeps the pin always in the desired position (shown in Fig. 2). To enable the pin to turn more easily, a washer is placed within the recess 14 on the ring 7a and the head 13 of the pin is riveted over the washer. The rings 7 and 7a are provided with circular recesses 14 which are adapted to receive the washers and riveted heads 13, and the T-shaped heads 11. This construction prevents the protrusion of the locking member beyond the outer side of the rings. The bottom of the recesses in the ring 7 present clamping surfaces 15, upon which the beveled or cam surfaces of the T-shaped heads 11 act. The pins are just long enough to pass through the core and the ring so that the highest part of the cam surfaces on the heads 11 just overlie the surfaces 15, and it will be easily seen that a slight turn of the heads will clamp the two rings on the core sections. In the construction shown it is only necessary to give the heads a quarter turn to insure the locking of the rings to the core.

To assemble a core, first the several arcuate sections are placed upon the ring 7a, the pins 10 projecting through the holes 12 in the sections. The ribs 6 fit into the annular groove of the ring 7a and are correctly positioned thereby. The second ring is then placed over the projecting heads 11 of the pins, the channel therein registering with the ribs 5 of the core sections. By giving each pin a quarter turn the rings are locked together over the inner edge of the core sections. The core is then ready to have a tire built thereon. To disassemble, the pins are given a quarter turn in the reverse direction, the heads thereby registering within the slots, and the ring 7 is removed first and then the ring 7ª with the pins 10 is withdrawn from the core. The core may then be collapsed and removed from the finished tire carcass. The construction described is simple, cheap, thoroughly durable, and easily manipulated, and as the pins are always retained in the ring 7ª, there is no danger of losing any parts of the core.

The foregoing detailed description has been given for clearness of understanding only and no unnecessary limitation should be understood therefrom, many changes in form and construction may be made, without departing from the spirit of the invention, within the scope of the appended claims.

I claim:

1. A core of the character set forth, comprising a plurality of arcuate sections provided with inwardly extending flanges which when in an assembled condition, form an annular flange, rings adapted to lie on each side of said flange, and a locking means passing through said segmental flanges and said rings, said means being irremovably attached to one of said rings.

2. A core of the character set forth, comprising a plurality of arcuate sections, provided with inwardly extending flanges which, when in an assembled condition, form an annular flange, locking rings adapted to lie on each side of said flange, and a locking means passing through said segmental flanges and said rings, said means having a cam surface on one end adapted to engage one of said locking rings and force it into clamping arrangement with the core sections.

3. A core of the character set forth, comprising a plurality of arcuate sections, provided with inwardly extending flanges which, when in an assembled condition, form an annular flange, locking rings adapted to lie on each side of said flange, and a locking means passing through said segmental flanges and said rings one end of said means being connected with one of the rings, the other end having a cam surface adapted to engage the other of said rings and force it into clamping arrangement with the core sections.

4. A core of the character set forth, comprising a plurality of arcuate sections, provided with inwardly extending flanges, when in an assembled condition, form an annular flange, locking rings adapted to lie on each side of said flange, and a locking means passing through said segmental flanges and said rings, said locking means having a T-shaped head, the under face of which is beveled.

5. A collapsible core comprising a plurality of separable sections, locking rings for holding the sections together, and means to draw the rings together to clamp the core in assembled relation, said means being attached to one of said rings.

6. A collapsible core comprising a plurality of separable sections, locking rings for holding the sections together and means to draw the rings together to clamp the core in assembled relation, said means being rotatably but irremovably connected to one of said rings.

7. A collapsible core comprising a plurality of separable sections, locking rings for holding the sections together, and means to draw the rings together to clamp the core in assembled relation, said means being attached to one of said rings and provided with a cam surface to cooperate with the other ring.

8. A collapsible core comprising a plurality of separable sections, locking rings for holding the sections together, and means to draw the rings together to clamp the core in assembled relation, said means being rotatably but irremovably connected to one of said rings and provided with a cam surface to cooperate with the other rings.

9. A collapsible core comprising a plurality of separable sections, locking rings for holding the sections together, and means to hold the rings in position comprising a plurality of pins, each pin being rotatably mounted in one ring, a formation on said pin preventing longitudinal movement thereof, and a cam head adapted to project through the other clamping ring in one position, but to force the rings together when turned in another position.

HAL E. TOWNSEND.